(12) United States Patent
Kato et al.

(10) Patent No.: US 8,116,176 B2
(45) Date of Patent: Feb. 14, 2012

(54) THERMALLY ASSISTED MAGNETIC HEAD-SLIDER AND HEAD-GIMBAL ASSEMBLY

(75) Inventors: Yukio Kato, Sagamihara (JP); Irizo Naniwa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/950,146

(22) Filed: Nov. 19, 2010

(65) Prior Publication Data
US 2011/0122735 A1 May 26, 2011

(30) Foreign Application Priority Data
Nov. 25, 2009 (JP) .................................. 2009-267549

(51) Int. Cl.
*G11B 11/00* (2006.01)
(52) U.S. Cl. ................................ 369/13.33; 369/112.27
(58) Field of Classification Search ................ 369/13.33, 369/13.32, 13.24, 13.14, 13.03, 13.02, 13.12, 369/112.27, 112.09, 112.14, 112.21; 360/59, 360/313, 245.3, 126, 123.17, 125.31, 128, 360/125.74, 125.02
See application file for complete search history.

(56) References Cited

U.S. PATENT DOCUMENTS

| | | | | |
|---|---|---|---|---|
| 8,023,225 B2 * | 9/2011 | Shimazawa et al. | ....... | 360/125.4 |
| 2009/0052076 A1 | 2/2009 | Shimazawa et al. | | |
| 2011/0090770 A1 * | 4/2011 | Iwanabe et al. | ........... | 369/13.24 |
| 2011/0141862 A1 * | 6/2011 | Arai et al. | .................. | 369/13.33 |
| 2011/0205660 A1 * | 8/2011 | Komura et al. | ................. | 360/59 |
| 2011/0205865 A1 * | 8/2011 | Matsushima et al. | ...... | 369/13.33 |

FOREIGN PATENT DOCUMENTS
JP 2008-10026 A 1/2008
JP 2009-54205 A 3/2009
* cited by examiner

*Primary Examiner* — Ali Neyzari
(74) *Attorney, Agent, or Firm* — Mattingly & Malur, PC

(57) ABSTRACT

A thermally assisted magnetic head-slider includes an air-bearing slider, a metal film, and a semiconductor laser unit. The metal film having an aperture in a part through which light from the semiconductor laser unit passes is disposed between a surface opposite to an air-bearing surface of the air-bearing slider and the semiconductor laser unit, and a material to adjust refractive index is provided in the aperture. A bottom surface of the metal film including the material to adjust refractive index is disposed to be in close contact with a surface opposite to the air-bearing surface side of the air-bearing slider, and the semiconductor laser unit is disposed to be in close contact with a top surface of the metal film including the material to adjust refractive index.

20 Claims, 5 Drawing Sheets

THERMALLY ASSISTED MAGNETIC HEAD-SLIDER AND HEAD-GIMBAL ASSEMBLY

The present application claims priority from Japanese application serial No. 2009-267549, filed on (Nov. 25, 2009), the content of which is hereby incorporated by reference into this application.

FIELD OF THE INVENTION

The present invention relates to a magnetic head-slider and a head-gimbal assembly for realizing a high density recording of a magnetic disk device, and more particularly, to a magnetic head-slider and a head-gimbal assembly for thermally assisted recording.

BACKGROUND OF THE INVENTION

With the rapid improvement in performance of a computer system such as a mobile PC, a workstation, or a high-capacity server, high density recording of a magnetic disk device which is an external recoding device for such a computer system is being required. In order for high density recording of a magnetic disk device, it is necessary to reduce a distance between magnetic recording medium and a magnetic head-slider, reduce the size of grains constituting a magnetic film of the magnetic recoding medium, and enhance the coercivity of the magnetic recording medium. In the magnetic recording media, reducing the grain size causes noise reduction; however, a problem in which the grains become thermally unstable occurs. For this reason, in order to reduce the grain size and ensure thermal stability at the same time, it is necessary to increase the anisotropy field of a magnetic layer of the magnetic recording medium. This means that it is necessary to further increase a head magnetic field strength necessary for recording information. However, since there is a limit to the size of a magnetic head for recording, it becomes difficult to increase the anisotropy field, that is, to enhance the coercivity. As a result, high density recording becomes impossible.

In order to solve this, there has been proposed a thermally assisted recording method which heats magnetic recording medium with light only at a recording moment and uses near-field light to lower the coercivity of magnetic recording medium. The near-field light is an electromagnetic field localized in the vicinity of a micro object equal to or less than the wavelength of the light, and when light enters a metal object, plasmon resonance is excited in the metal object and strong near-field light is generated in the vicinity of a fore-end part of the metal object. In this case, the diameter of the irradiation spot of the near-field light is several tens of nm and thus it becomes possible to heat a part having the same size as the grain size of the magnetic recording medium. For this reason, in order to obtain a magnetic field sufficient for recording, a magnetic head for recording according to the prior art heats only a micro region to lower the coercivity, thereby making it possible to perform recording on magnetic recording media having high anisotropy field strength, that is, high coercivity for super-high density recording.

In general, a small-size low-power-consumption semiconductor laser is used as a light source from a point of view in which it is used in a magnetic disk device. In order to guide light from a semiconductor laser to a near-field light element, an optical component, for example, a reflective mirror, a lens, an optical fiber, an optical waveguide, etc., is used. However, since use of the above-mentioned optical component increases optical loss (hereinafter, referred to as coupling loss) in a coupling part, it is necessary to guide the light with as few components as possible. Reducing components is preferable because the length of a light path becomes short and thus loss due to attenuation is also reduced. Therefore, it is possible to minimize loss by disposing a semiconductor laser unit which is a light source in the vicinity of a magnetic head-slider.

As prior arts regarding thermally assisted recording in which a semiconductor laser unit is disposed in a magnetic head-slider as described above, there are techniques described in JP-A-2009-54205 and JP-A-2008-10026.

In JP-A-2009-54205, there is disclosed a method of guiding light to a near-field light element through an optical waveguide by disposing a semiconductor laser unit in a direction perpendicular to an air-bearing surface of a magnetic head-slider.

In JP-A-2008-10026, a semiconductor laser unit is disposed in a direction parallel with an air-bearing surface of a magnetic head-slider, the propagation direction of light is changed by 90 degrees with a diffractive optical element, and light is guided to a near-field light element through a refractive-index adjusting layer and an optical waveguide.

As described in JP-A-2009-54205, when a semiconductor laser unit is disposed on a magnetic head-slider side surface, since the semiconductor laser unit structurally becomes a cantilever structure, the semiconductor laser unit largely vibrates when the magnetic head-slider is flew on magnetic recoding medium. For this reason, relative misalignment between a light emitting opening of the semiconductor laser unit and a light receiving opening of an optical waveguide occurs. As a result, there is a problem in which coupling loss occurs. An increase in the coupling loss results in an increase in consumed power, which is a big problem.

Meanwhile, in the technique described in JP-A-2008-10026, a semiconductor laser unit not only generates light but also functions as a heat source. In particular, while driving a semiconductor laser, all of the current is converted into heat until a current value reaches an oscillation threshold value at which laser oscillation of the semiconductor laser unit starts such that the semiconductor laser unit produces heat by itself. In this prior art, countermeasures against heat are not mentioned. Further, as a material to adjust refractive index of this prior art, polymethylphenylsilane which is UV curable resin is used. This material is thermally decomposed by heat so as to generate contamination such as siloxne. This contamination is a material that inhibits flying in a magnetic disk device, and once contamination is generated, at the worst case scenario, probability in that a head crash occurs is high. As a result, there is a problem in which the reliability of the magnetic disk device is undermined.

SUMMARY OF THE INVENTION

The present invention has been made in consideration of the problems of the thermally assisted magnetic recording methods according to the prior art. An object of the present invention is to provide a thermally assisted magnetic head-slider and a head-gimbal assembly having advantages of suppressing an increase in coupling loss due to heat produced by a semiconductor laser unit and preventing generation of contamination.

In order to achieve the object, according to one aspect of the present invention, a thermally assisted magnetic head-slider includes a recording/reproducing element that is configured to record and reproduce information and is disposed on an air-bearing surface side, a near-field light element that is configured to generate near-field light and is disposed on the air-bearing surface side, a semiconductor laser unit that serves as a light source for heating and is disposed on a surface different from the air-bearing surface side, and an optical waveguide that has a clad part and a core part guiding light from the semiconductor laser unit to a near-field light element. In the thermally assisted magnetic head-slider, a metal film having an aperture at a part through which the light from the semiconductor laser unit passes is disposed between the surface different from the air-bearing surface side and the semiconductor laser unit, a material to adjust refractive index is disposed in the aperture, a bottom surface of the metal film including the material to adjust refractive index is disposed to be in close contact with the surface different from the air-bearing surface side, and the semiconductor laser unit is disposed to be in close contact with a top surface of the metal film including the material to adjust refractive index.

The surface different from the air-bearing surface side may be a surface opposite to an air-bearing surface.

In the optical waveguide, a refractive index of the core part may be higher than a refractive index of the clad part.

A refractive index of the material to adjust refractive index may be in a range between the refractive index of the core part of the optical waveguide and the refractive index of the clad part of the optical waveguide.

The material to adjust refractive index may be $Al_2O_3$, or a fluorine-based organic compound having a hydroxyl group in a molecular end group, in particular, perfluoropolyether.

The metal film may be a metal selected from Au, Ag, Al, Cu, and Ti, or an alloy of two or more thereof.

In order to achieve the object, according to another aspect of the present invention, a thermally assisted magnetic head-slider having a recording/reproducing element that is configured to record and reproduce information and is disposed on an air-bearing surface side, a near-field light element that is configured to generate near-field light and is disposed on the air-bearing surface side, a semiconductor laser unit that serves as a light source for heating and is disposed on a surface different from the air-bearing surface side, and an optical waveguide that has a clad part and a core part guiding light from the semiconductor laser unit to a near-field light element. In the thermally assisted magnetic head-slider, a substrate having a groove part and a funnel-form aperture formed at a part of the groove part through which the light from the semiconductor laser unit passes is disposed between the surface different from the air-bearing surface side and the semiconductor laser unit, a first material to adjust refractive index and a second material to adjust refractive index which surrounds the first material to adjust refractive index and has a refractive index lower than that of the first material to adjust refractive index are disposed in the funnel-form aperture of the substrate, a part of the substrate including the funnel-form aperture is partially eliminated to form a groove part and a metal film is disposed on the substrate, the semiconductor laser unit has a step part fitting in the groove part of the substrate, the substrate is disposed to be in close contact with the surface different from the air-bearing surface side, and the semiconductor laser unit is disposed to be in close contact with the metal film.

The first, material to adjust refractive index may be a fluorine-based organic compound having a hydroxyl group in a molecular end group, in particular, perfluoropolyether.

The second material to adjust refractive index may be an oxide or a fluorine-based compound, in particular, $MgF_2$.

The metal film may be a metal selected from Au, Ag, Al, Cu, and Ti, or an alloy of two or more thereof.

In order to achieve the object, according to a further aspect of the present invention, in a head-gimbal assembly, the thermally assisted magnetic head-slider is fixed to a gimbal spring of a suspension through the metal film, and a pivot provided in a load beam is abutted onto an upper part of the semiconductor laser unit.

According to the embodiments of the present invention, it is possible to suppress an increase in coupling loss due to heat produced by a semiconductor laser unit and to prevent generation of contamination in a thermally assisted magnetic head-slider and a head-gimbal assembly.

DETAILED DESCRIPTION OF THE PREFERRED EMBODIMENTS

Hereinafter, embodiments of the present invention will be described in detail with reference to the drawings.

Embodiment 1

Figure 1:
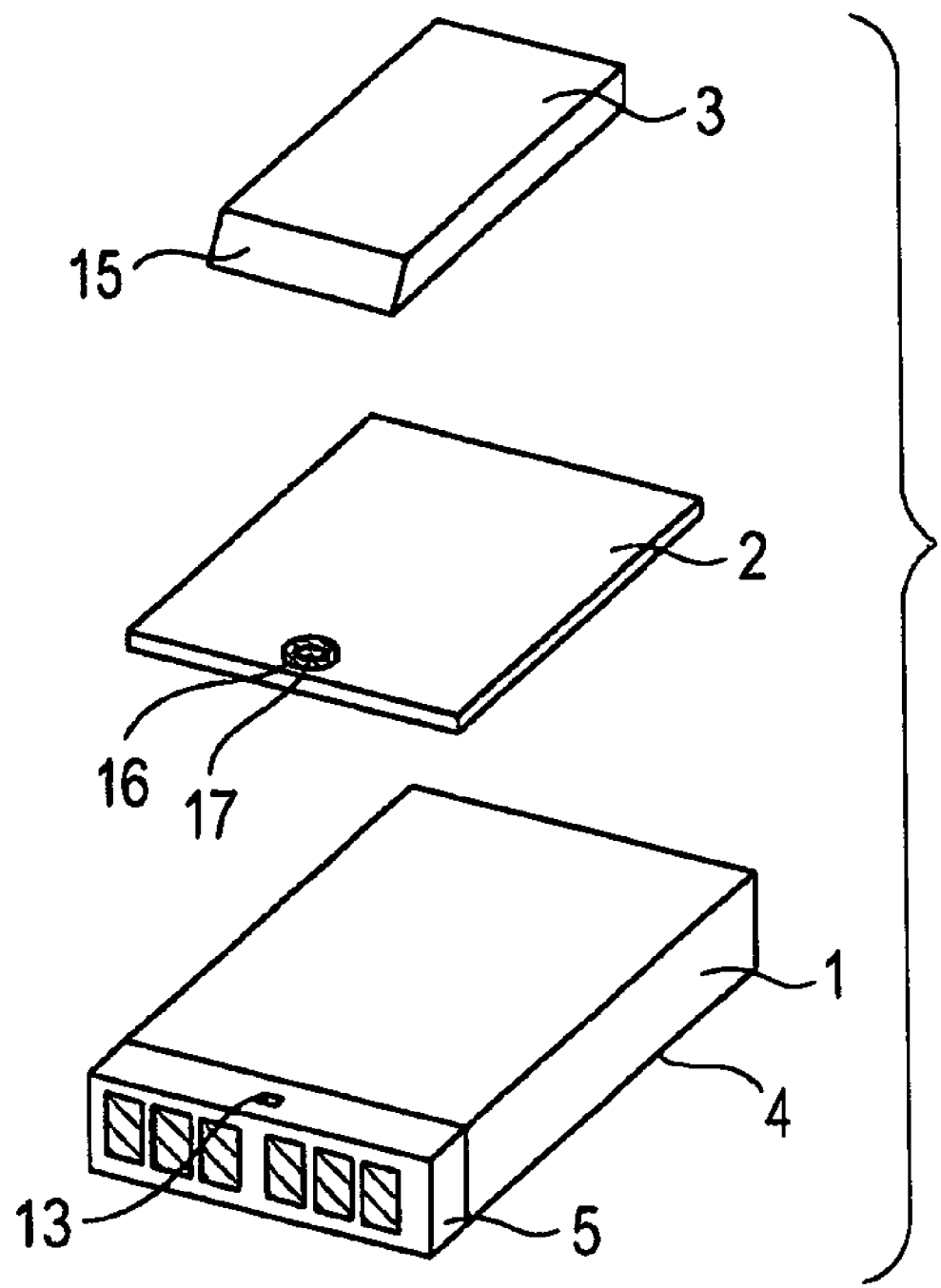
FIG. 1 is an assembled perspective view of a thermally assisted magnetic head-slider according to Embodiment 1 of the present invention.
Figure 2:
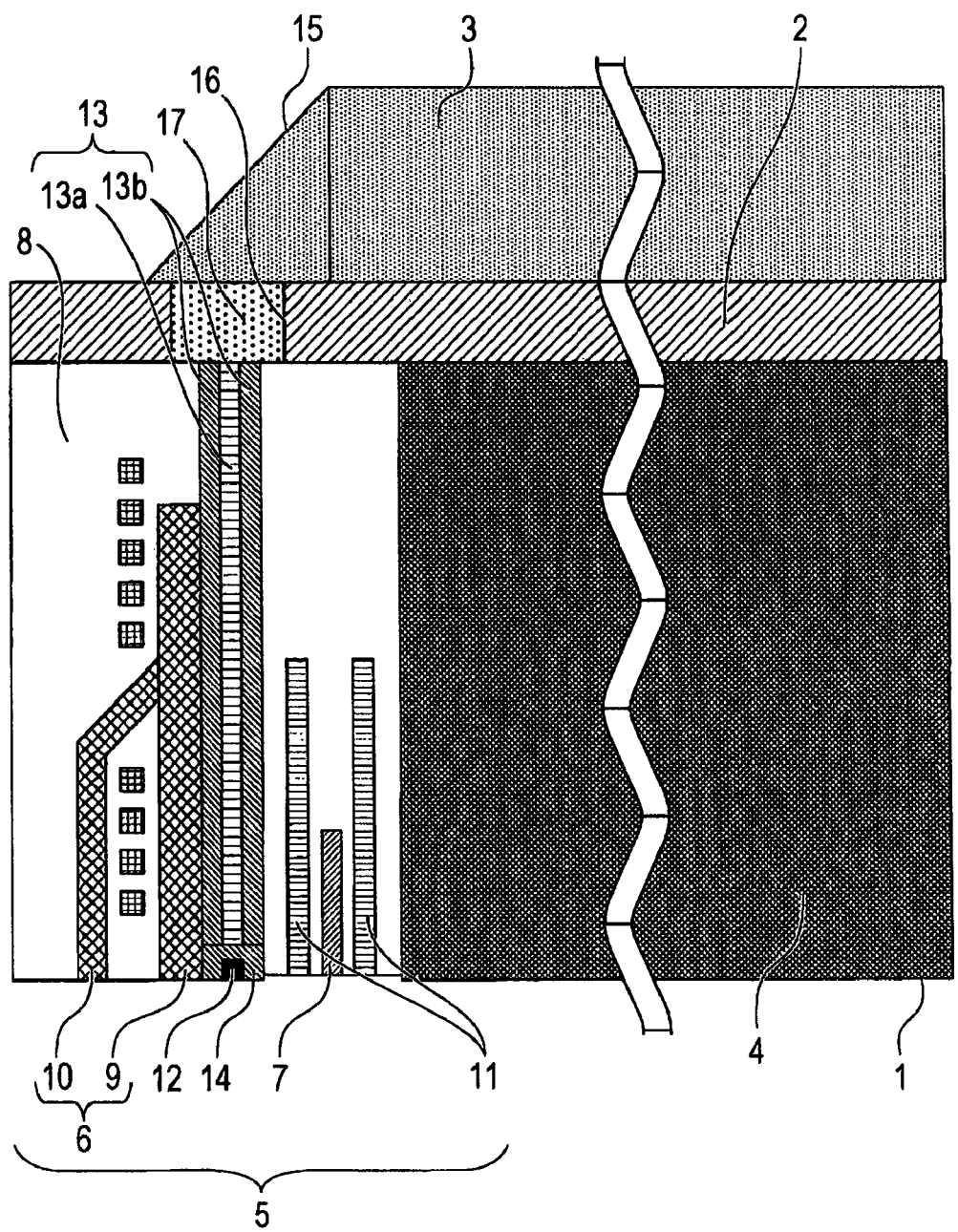
FIG. 2 is a cross-sectional view of the thermally assisted magnetic head-slider according to Embodiment 1 of the present invention.

FIG. 1 is an assembled perspective view of a thermally assisted magnetic head-slider according to Embodiment 1 of the present invention. FIG. 2 shows a cross-sectional view of the thermally assisted magnetic head-slider according to Embodiment 1 of the present invention. The thermally assisted magnetic head-slider according to Embodiment 1 is composed of an air-bearing slider 1 flying on magnetic recording medium, a metal film 2, and a semiconductor laser unit 3 that are stacked with, for example, an adhesive interposed therebetween. The air-bearing slider 1 is composed of a slider substrate 4, and a thin film magnetic head unit 5 including a recording/reproducing element, an optical waveguide, and a near-field light element. The slider substrate 4 is made of a material represented by a sintered body of TiC and $Al_2O_3$. At an air-bearing surface for flying on magnetic recording medium, a fine step (a step bearing) is provided by a process such as ion milling or etching, and faces the magnetic recording medium to perform a function of generating air pressure.

In the thin film magnetic head unit 5, a recording element 6 and a reproducing element 7 are formed in an insulating layer 8 of $Al_2O_3$. The recording element 6 is a single-magnetic-pole-type recording head for perpendicular magnetic recording that has a main magnetic pole 9 and an auxiliary magnetic pole 10, and recording is performed on the magnetic recording medium by a magnetic field leaked from the main magnetic pole 9. The reproducing element 7 is disposed between magnetic shields 11, and is composed of a magnetic-resistor-effect element. Between the recording element 6 and the reproducing element 7, a near-field light element 12, and an optical waveguide 13 (which is composed of a core 13a and a clad 13b) for guiding light to the near-field light element 12 is formed. $Ta_2O_5$ (having a refractive index of 2.18) is used as the material of the core 13a of the optical waveguide 13, and $SiO_2$ (having a refractive index of 1.48) is used as the material of the clad 13b. The cross-sectional shape of the optical waveguide 13 is a square shape and the width thereof is 500 nm.

The shape of the near-field light element 12 is a two-dimensional triangle shape, the material thereof is Au, and the length thereof is 100 nm. A near-field-light-element neighboring part 14 is formed of a material having a refractive index smaller than the refractive index of the core 13a in order to prevent the strength of near-field light from being reduced, and covers the near-field light element 12. In this embodiment, the material of the near-field-light-element neighboring part 14 may be $SiO_2$. The shape of the near-field light element 12 may be a rectangle shape, a trapezoid shape, a C shape, or an H shape other than the two-dimensional triangle shape. The material of the near-field light element 12 may be a material having conductivity, and may be a material selected from metals such as Ag, Cu, Al, Fe, and Ni, in addition to Au, and an alloy of two or more thereof.

The semiconductor laser unit 3 includes a substrate which is formed of a material selected from GaAs, InP, sapphire, etc., and has an active layer or a clad layer formed therein. The semiconductor laser unit 3 uses an edge-emitting laser and has a micro mirror 15 making an angle of 45 degrees to the propagation direction of light. Therefore, early light emitted from the semiconductor laser unit 3 is parallel to the longitudinal direction of an air-bearing slider 1, however, the emitted light is rotated by about 90 degrees by the micro mirror 15 inclined at 45 degrees, thereby capable of coupling the emitted light to a light receiving opening of the optical waveguide 13 on the opposite side to an air-bearing surface of the air-bearing slider 1. In order to dissipate heat from the semiconductor laser unit 3, the metal film 2 between the semiconductor laser unit 3 and the air-bearing slider 1 is formed of a material selected from Au, Ag, Al, Cu, Ti, etc., having high conductivity, or an alloy thereof, and Cu is used in Embodiment 1.

The metal film 2 is formed by a sputtering method, a vapor deposition method, a plating method, etc. and the thickness thereof may be set to, for example, 0.5 μm to 10 μm. Further, at optical axis parts of the optical waveguide 13 and the semiconductor laser unit 3, an aperture 16 having a diameter of 10 μm to 30 μm is provided. The aperture 16 is configured to be covered by the main body of the semiconductor laser unit 3. Inside the aperture 16, a material 17 to adjust refractive index composed of $Al_2O_3$ (having a refractive index of 1.60) is disposed. The refractive index of the material 17 to adjust refractive index is higher than the refractive index of the insulating layer 8 of $Al_2O_3$ (which is 1.50) in the thin film magnetic head unit 5. This is because adjustment is possible by changing a gas pressure of, for example, Ar when the material 17 to adjust refractive index is formed by a sputtering method, etc. Further, as the material 17 to adjust refractive index, a fluorine-based organic compound having the same skeleton as molecular formula of a lubricant agent constituting the magnetic recording media and having a hydroxyl group in an molecular end group, for example, perfluoropolyether (having a refractive index of 1.4) can be used.

When light emitted from the semiconductor laser unit 3 passes through the material 17 to adjust refractive index, at the interface between a semiconductor laser emitting opening and the material 17 to adjust refractive index and the interface between the material 17 to adjust refractive index and the core 13a of the optical waveguide, the degree of reflectance changes according to the refractive index difference between the interfaces. For this reason, reducing the refractive index difference is preferable, and makes it possible to reduce loss during coupling.

Figure 3:
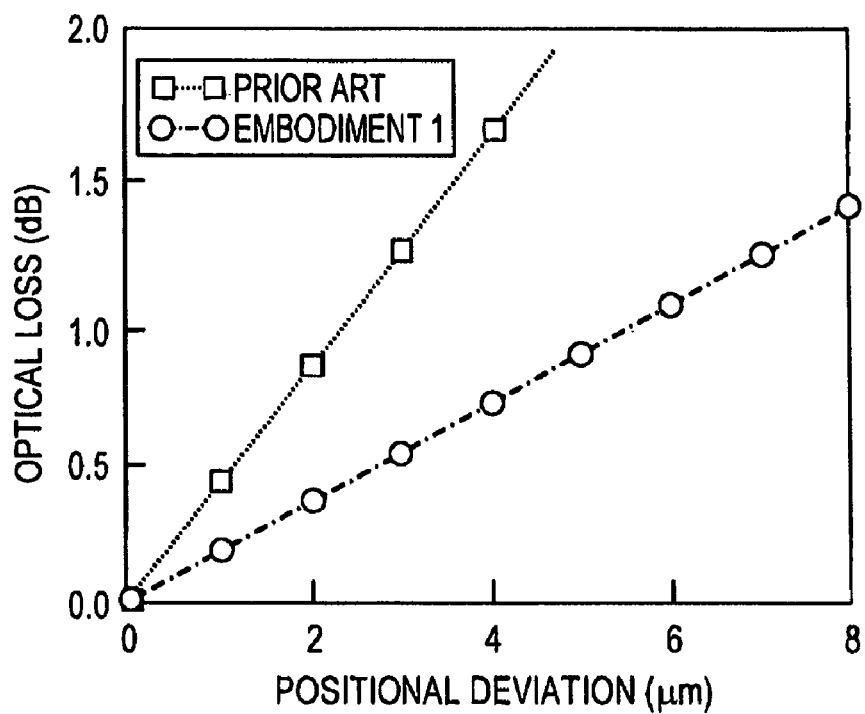
FIG. 3 is a view illustrating an effect of the thermally assisted magnetic head-slider according to Embodiment 1 of the present invention.

FIG. 3 shows results of comparison obtained by computing optical loss of Embodiment 1 in which the material 17 to adjust refractive index is inserted between the semiconductor laser unit 3 and the optical waveguide 13 and optical loss of an example according to the prior art in which a material to adjust refractive index is not used (only air is used). The computation was performed when a Gaussian Beam whose light spot having a diameter of 2 μm was used. In the case of Embodiment 1 using the material to adjust refractive index, optical loss when the position of an optical axis is deviated by 2 μm in an in-plane direction is 0.3 dB, and in the case of the example according to the prior art, optical loss when the position of an optical axis is deviated in a 2 μm in-plane direction is 0.8 dB. For this reason, the material 17 to adjust refractive index is disposed on the optical axis of the magnetic head unit, thereby capable of making the coupling loss less than that of the example according to the prior art in which the material 17 to adjust refractive index is not used, that is, only an aperture (air) exists. Light that could not be input to the optical waveguide due to the positional deviation is reflected or absorbed by an optical component. Then, the coupling loss thereof is converted into heat. As a result, there is a problem in which the positional deviation increases due to thermal expansion.

In Embodiment 1, since the material 17 to adjust refractive index is covered by the metal film 2, it becomes possible that heat generated due to coupling loss is dissipated by the metal film 2. As a result, it becomes possible to reduce the positional deviation of the optical axis due to heat expansion, which is preferable. Further, the top surface of the material 17 to adjust refractive index is in close contact with the semiconductor laser unit 3 and the bottom surface thereof is in close contact with the optical waveguide 13. Therefore, the material 17 to adjust refractive index does not come into direct contact with air, thereby capable of suppressing generation of contamination. Furthermore, the range of choices for substances of the material 17 to adjust refractive index becomes larger.

Figure 4:
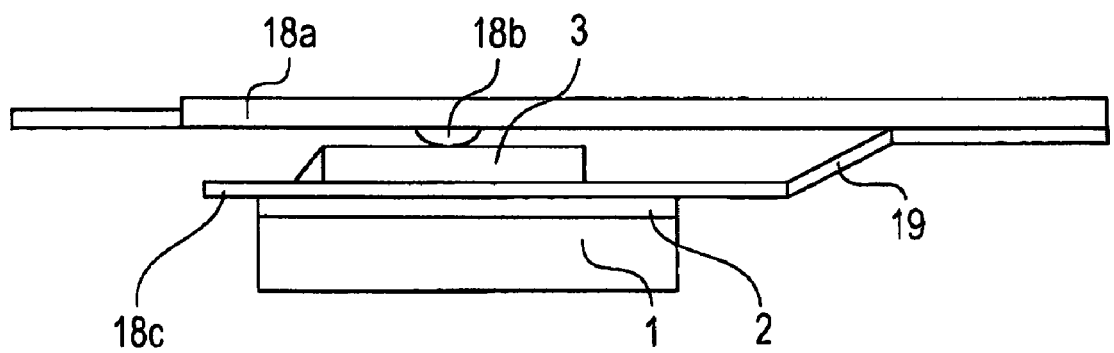
FIG. 4 is a schematic view when the thermally assisted magnetic head-slider according to Embodiment 1 is used as a head-gimbal assembly.
Figure 5:
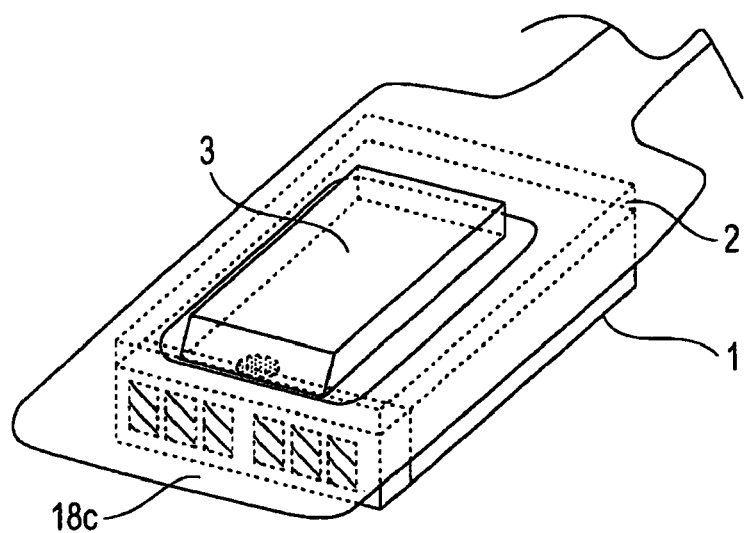
FIG. 5 is an assembled perspective view when the thermally assisted magnetic head-slider according to Embodiment 1 is used as a head-gimbal assembly.

Next, the thermally assisted magnetic head-slider according to this embodiment is assembled as a head-gimbal assembly. FIG. 4 is a schematic view when the thermally assisted magnetic head-slider according to Embodiment 1 is used as a head-gimbal assembly. The thermally assisted magnetic head-slider is attached to a plate-spring-shaped suspension 18. The suspension 18 includes a base material (load beam) 18a, a pivot 18b applying load, and a gimbal spring 18c allowing the air-bearing slider to freely rotate. The gimbal spring 18c is attached to the base of the base material 18a of the suspension and is fixed to the metal film 2 on the slider substrate 4 by an adhesive. The pivot 18b is abutted onto an upper part of the semiconductor laser unit 3 corresponding to the location of the center of the thermally assisted magnetic head-slider. Since the part of the semiconductor laser unit 3 becomes higher as compared to an assembly for a magnetic disk according to the prior art, in order to address this, the vicinity of the base of the gimbal spring 18c is bent, which is a bending part 19. FIG. 5 is an assembled perspective view when the base material 18a and the pivot 18b of the suspension are omitted. There is adapted a configuration in which heat from the semiconductor laser unit 3 is dissipated to the gimbal spring 18c through the metal film 2. Further, since the pivot 18b and the semiconductor laser unit 3 are in contact with each other, there is an effect in which the heat is also dissipated through the contact thereof.

Embodiment 2

Embodiment 2 of the present invention will be described with reference to FIGS. 6 and 7. Components having the same functions as those of Embodiment 1 are designated by the same reference numerals and a description thereof is omitted. In Embodiment 2, an embodiment when the distance between the light emitting opening of the semiconductor laser unit 3 and the light receiving opening of the optical waveguide 13 (hereinafter, referred to as an optical length) is short is disclosed. It is known that as an optical length decreases, coupling loss decreases. In Embodiment 2, the optical length is 20 μm. In this embodiment, a configuration having a short optical length is provided by eliminating a Si substrate by etching.

Figure 6:
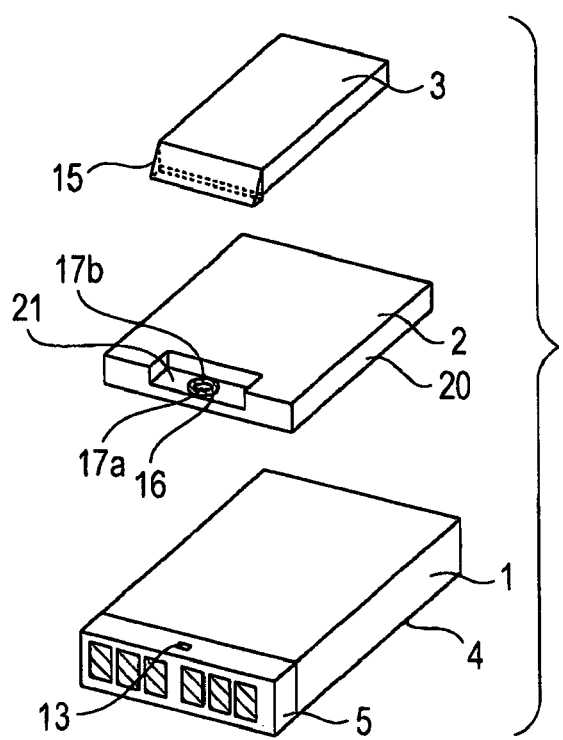
FIG. 6 is an assembled perspective view of a thermally assisted magnetic head-slider according to Embodiment 2 of the present invention.
Figure 7:
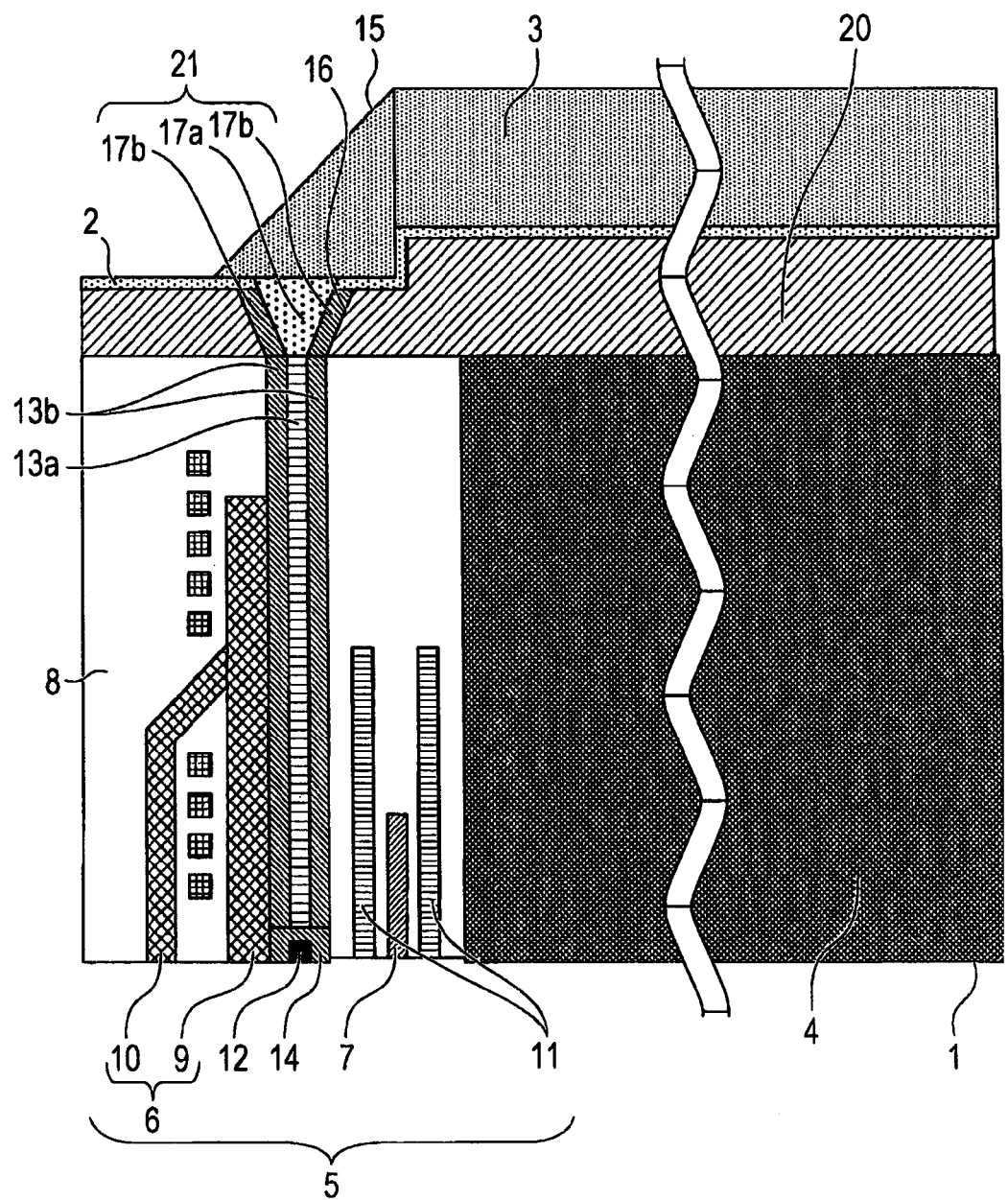
FIG. 7 is a cross-sectional view of the thermally assisted magnetic head-slider according to Embodiment 2 of the present invention.

FIG. 6 shows an assembled view of Embodiment 2, and FIG. 7 shows a cross-sectional view of a thermally assisted magnetic head-slider according to Embodiment 2 of the present invention. A Si substrate 20 is used as a substrate, and has a thickness of 100 μm. The aperture 16 and the vicinity of the aperture are eliminated by etching, and a funnel-form aperture 16 and a groove part (step part) 21 are provided. The depth of the groove part 21 is 80 μm. In the funnel-form aperture 16, the diameter of a lower hole is 20 μm, and the diameter of an upper hole is 50 μm. Then, a second material 17b to adjust refractive index is formed of $MgF_2$ in the funnel-form aperture 16 by, for example, a sputtering method. Next, the metal film 2 having high conductivity and a thickness of several μm is formed on a surface to which the semiconductor laser unit 3 is attached. In particular, the metal film 2 is formed of Au.

The core 13a of the optical waveguide 13 and the near-field-light-element neighboring part 14 inside the thin film magnetic head unit 5 are formed of $Al_2O_3$, and the clad 13b is formed of $MgF_2$. As the first material 17a to adjust refractive index, a fluorine-based organic compound having the same skeleton as a molecular formula of a lubricant agent constituting the magnetic recording media and having a hydroxyl group in a molecular end group, for example, perfluoropolyether (having a refractive index of 1.4) can be used. As the second material 17b to adjust refractive index, $MgF_2$ (having a refractive index of 1.32) is used.

Next, the thin film magnetic head unit 5 is formed on the slider substrate 4, and then the Si substrate 20 is attached to the opposite surface of the magnetic head-slider to the air-bearing surface with an adhesive, etc. Further, the first material 17a to adjust refractive index is formed by dropping several milligrams of perfluoropolyether from the top surface of the aperture 16. Finally, the semiconductor laser unit 3 is fixed by an adhesive in order to prevent the first material 17a to adjust refractive index from leaking from the aperture. Here, if the step part is formed by eliminating the substrate of the semiconductor laser unit 3 at the early stage of the manufacturing of the semiconductor laser unit 3 in order to bring the step part 21 of the Si substrate 20 into close contact with a part of the semiconductor laser unit 3 where the micro mirror 15 is formed, it is possible to bring the semiconductor laser unit 3 into contact with the metal film 2 as shown in FIG. 7, such that they are assembled.

The refractive index of the first material 17a to adjust refractive index is 1.4. Therefore, light from the light emitting opening of the semiconductor laser unit passes through the first material 17a to adjust refractive index and enters the core 13a of the optical waveguide 13. There is adapted a configuration in which the refractive index of the first material 17a to adjust refractive index is larger than the refractive index of the second material 17b to adjust refractive index. Therefore, leakage light deviated from the optical axis is reflected at the interface between the first material 17a to adjust refractive index and the second material 17b to adjust refractive index so as to be guided to the core 13a of the optical waveguide 13. As a result, there is a merit in which absorption to the metal film 2 is suppressed. It is possible to prevent positional deviation of light from the light emitting opening of the semiconductor laser unit 3 by adopting a funnel-form aperture. Further, the top surface of the first material 17a to adjust refractive index is in close contact with the semiconductor laser unit 3, and the bottom surface thereof is in close contact with the optical waveguide 13. Therefore, even though the aperture is expanded due to thermal expansion during light irradiation, the first material 17a to adjust refractive index does not come into direct contact with air and it is possible to suppress generation of contamination. Perfluoropolyether which is the first material 17a to adjust refractive index is used as a lubricant agent for a magnetic disk, and is more difficult to be vaporized even when heat is applied, as compared to a general industrial mineral oil. If the molecular weight of perfluoropolyether increases, vaporization becomes more difficult. Therefore, from a point of view in which decomposition or vaporization by heat is suppressed, a material having the molecular weight of, for example, 1000 or greater may be used as the first material 17a to adjust refractive index.

Since a material used as the second material 17b to adjust refractive index should have a low refractive index, the main component of the used material becomes an oxide or a fluorine-based compound. Since a molecular end group of perfluoropolyether has a hydroxyl group and thus the hydroxyl group of the molecular end group is strongly chemisorbed with the oxide or the fluorine-based compound, a chemical change is difficult to occur due to external force such as heat, which is preferable.

Meanwhile, since the first material 17a to adjust refractive index molecularly has the same skeleton as the lubricant agent used in the magnetic disk device and high affinity, even when a small amount of the first material 17a to adjust refractive index leaks due to thermal expansion, problems do not occur.

According to the above-mentioned configurations, the object of the present invention is achieved. In particular, according to Embodiment 2, since the optical length is set to be short, it is possible to further reduce coupling loss.

The thermally assisted magnetic head-slider and the head-gimbal assembly according to the embodiments of the present invention can be used for a high-recording-density magnetic disk device.

What is claimed is:

1. A thermally assisted magnetic head-slider having a recording/reproducing element that is configured to record and reproduce information and is disposed on an air-bearing surface side, a near-field light element that is configured to generate near-field light and is disposed on the air-bearing surface side, a semiconductor laser unit that serves as a light source for heating and is disposed on a surface different from the air-bearing surface side, and an optical waveguide that has a clad part and a core part guiding light from the semiconductor laser unit to a near-field light element, wherein a metal film having an aperture at a part through which the light from the semiconductor laser unit passes is disposed between the surface different from the air-bearing surface side and the semiconductor laser unit, a material to adjust refractive index is disposed in the aperture, a bottom surface of the metal film including the material to adjust refractive index is disposed to be in close contact with the surface different from the air-bearing surface side, and the semiconductor laser unit is disposed to be in close contact with a top surface of the metal film including the material to adjust refractive index.

2. The thermally assisted magnetic head-slider according to claim 1, wherein the surface different from the air-bearing surface side is a surface opposite to an air-bearing surface.

3. The thermally assisted magnetic head-slider according to claim 1, wherein in the optical waveguide, a refractive index of the core part is higher than a refractive index of the clad part.

4. The thermally assisted magnetic head-slider according to claim 3, wherein a refractive index of the material to adjust refractive index is in a range between the refractive index of the core part of the optical waveguide and the refractive index of the clad part of the optical waveguide.

5. The thermally assisted magnetic head-slider according to claim 1, wherein the material to adjust refractive index is $Al_2O_3$.

6. The thermally assisted magnetic head-slider according to claim 1, wherein the material to adjust refractive index is a fluorine-based organic compound having a hydroxyl group in a molecular end group.

7. The thermally assisted magnetic head-slider according to claim 1, wherein the material to adjust refractive index is perfluoropolyether.

8. The thermally assisted magnetic head-slider according to claim 1, wherein the metal film is a metal selected from Au, Ag, Al, Cu, and Ti, or an alloy of two or more thereof.

9. The thermally assisted magnetic head-slider according to claim 1, wherein the material to adjust refractive index is $Al_2O_3$, and the metal film is a metal selected from Au, Ag, Al, Cu, and Ti, or an alloy of two or more thereof.

10. The thermally assisted magnetic head-slider according to claim 1, wherein the material to adjust refractive index is perfluoropolyether, and the metal film is a metal selected from Au, Ag, Al, Cu, and Ti, or an alloy of two or more thereof.

11. The thermally assisted magnetic head-slider according to claim 1, wherein the near-field light element is a metal selected from Au, Ag, Cu, Al, Fe, and Ni, or an alloy of two or more thereof.

12. A thermally assisted magnetic head-slider having a recording/reproducing element that is configured to record and reproduce information and is disposed on an air-bearing surface side, a near-field light element that is configured to generate near-field light and is disposed on the air-bearing surface side, a semiconductor laser unit that serves as a light source for heating and is disposed on a surface different from the air-bearing surface side, and an optical waveguide that has a clad part and a core part guiding light from the semiconductor laser unit to a near-field light element, wherein a substrate having a groove part and a funnel-form aperture formed at a part of the groove part through which the light from the semiconductor laser unit passes is disposed between the surface different from the air-bearing surface side and the semiconductor laser unit, a first material to adjust refractive index and a second material to adjust refractive index which surrounds the first material to adjust refractive index and has a refractive index lower than that of the first material to adjust refractive index are disposed in the funnel-form aperture of the substrate, a part of the substrate including the funnel-form aperture is partially eliminated to form a groove part and a metal film is disposed on the substrate, the semiconductor laser unit has a step part fitting in the groove part of the substrate, the substrate is disposed to be in close contact with the surface different from the air-bearing surface side, and the semiconductor laser unit is disposed to be in close contact with the metal film.

13. The thermally assisted magnetic head-slider according to claim 12, wherein the surface different from the air-bearing surface side is a surface opposite to an air-bearing surface.

14. The thermally assisted magnetic head-slider according to claim 12, wherein in the optical waveguide, a refractive index of the core part is higher than a refractive index of the clad part.

15. The thermally assisted magnetic head-slider according to claim 12, wherein the first material to adjust refractive index is a fluorine-based organic compound having a hydroxyl group in a molecular end group.

16. The thermally assisted magnetic head-slider according to claim 12, wherein the first material to adjust refractive index is perfluoropolyether.

17. The thermally assisted magnetic head-slider according to claim 15, wherein the second material to adjust refractive index is an oxide or a fluorine-based compound.

18. The thermally assisted magnetic head-slider according to claim 15, wherein the second material to adjust refractive index is $MgF_2$.

19. The thermally assisted magnetic head-slider according to claim 12, wherein the metal film is a metal selected from Au, Ag, Al, Cu, and Ti, or an alloy of two or more thereof.

20. A head-gimbal assembly comprising:
a thermally assisted magnetic head-slider having a recording/reproducing element that is configured to record and reproduce information and is disposed on an air-bearing surface side, a near-field light element that is configured to generate near-field light and is disposed on the air-bearing surface side, a semiconductor laser unit that serves as a light source for heating and is disposed on a surface different from the air-bearing surface side, and an optical waveguide that has a clad part and a core part guiding light from the semiconductor laser unit to a near-field light element, in which
a metal film having an aperture at a part through which the light from the semiconductor laser unit passes is disposed between the surface different from the air-bearing surface side and the semiconductor laser unit, a material to adjust refractive index is disposed in the aperture, a bottom surface of the metal film including the material to adjust refractive index is disposed to be in close contact with the surface different from the air-bearing surface side, and the semiconductor laser unit is disposed to be in close contact with a top surface of the metal film including the material to adjust refractive index, and
a suspension having a load beam, a pivot provided in the load beam, and a gimbal spring attached to the load beam at one end,
wherein the thermally assisted magnetic head-slider is fixed to the gimbal spring through the metal film, and an upper part of the semiconductor laser unit is in contact with the pivot.

* * * * *